United States Patent
Wu et al.

(10) Patent No.: US 9,025,092 B2
(45) Date of Patent: May 5, 2015

(54) LIQUID CRYSTAL DISPLAY COMPRISING LIQUID CRYSTAL LENS DRIVEN AT A FIRST TIME PERIOD AND A SECOND TIME PERIOD

(71) Applicant: Au Optronics Corporation, Hsinchu (TW)

(72) Inventors: Po-Wei Wu, Taichung (TW); Ming-Fang Chien, New Taipei (TW); I-Hsiung Huang, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 174 days.

(21) Appl. No.: 13/670,475

(22) Filed: Nov. 7, 2012

(65) Prior Publication Data
US 2013/0162919 A1  Jun. 27, 2013

(30) Foreign Application Priority Data

Dec. 21, 2011 (TW) .............................. 100147775 A
Jun. 14, 2012 (TW) .............................. 101121365 A

(51) Int. Cl.
*G02F 1/1335* (2006.01)
*G02F 1/1343* (2006.01)
*G02F 1/29* (2006.01)
(Continued)

(52) U.S. Cl.
CPC ............ *G02F 1/134309* (2013.01); *G02F 1/29* (2013.01); *G02B 27/2214* (2013.01); *H04N 13/0404* (2013.01); *H04N 13/0452* (2013.01); *G02F 1/13471* (2013.01); *G02F 2001/294* (2013.01); *G02F 2203/62* (2013.01)

(58) Field of Classification Search
USPC ................ 349/15, 33, 200; 345/419; 359/462
See application file for complete search history.

(56) References Cited

U.S. PATENT DOCUMENTS 7,250,923 B2  7/2007 Taira et al.
8,174,564 B2  5/2012 Kim et al.
(Continued)

FOREIGN PATENT DOCUMENTS

| CN | 1975510 | 6/2007 |
| CN | 101718936 | 6/2010 |
| WO | 2011088615 | 7/2011 |

OTHER PUBLICATIONS

"Office Action of China Counterpart Application", issued on Dec. 2, 2013, p. 1-p. 8, in which the listed references were cited.
(Continued)

*Primary Examiner* — Paul Lee
*Assistant Examiner* — Agnes Dobrowolski
(74) *Attorney, Agent, or Firm* — Jianq Chyun IP Office

(57) ABSTRACT

A display device including a liquid crystal lens and a display panel is provided. The liquid crystal lens is disposed above the display panel and includes a first substrate, a second substrate opposite to the first substrate, a liquid crystal layer between the first and the second substrates, driving electrodes located between the first substrate and the liquid crystal layer and arranged in a pitch, and an opposite electrode layer located between the second substrate and the liquid crystal layer. The display panel has display units arrange in the pitch. In a 3D display mode, two adjacent driving electrodes in the liquid crystal lens are respectively driven at a first time period and a second time period. The liquid crystal lens and the display panel are switched synchronically so that each display unit respectively displays images with different parallax at the first and the second time periods.

12 Claims, 3 Drawing Sheets

(51) Int. Cl.
*G02B 27/22* (2006.01)
*H04N 13/04* (2006.01)
*G02F 1/1347* (2006.01)

(56) References Cited

U.S. PATENT DOCUMENTS

2004/0263968 A1 12/2004 Kobayashi et al.
2007/0120973 A1* 5/2007 Kim et al. ................... 348/58
2010/0302490 A1 12/2010 Chiu
2011/0102689 A1* 5/2011 Chiu ............................ 349/15
2011/0292184 A1* 12/2011 de Greef ..................... 348/51

OTHER PUBLICATIONS

"Office Action of China Counterpart Application", issued on May 5, 2014, p. 1-p. 7, in which the listed references were cited.

* cited by examiner

LIQUID CRYSTAL DISPLAY COMPRISING LIQUID CRYSTAL LENS DRIVEN AT A FIRST TIME PERIOD AND A SECOND TIME PERIOD

CROSS-REFERENCE TO RELATED APPLICATION

This application claims the priority benefits of Taiwan application serial no. 100147775, filed on Dec. 21, 2011, and Taiwan application serial no. 101121365, filed on Jun. 14, 2012. The entirety of each of the above-mentioned patent applications is hereby incorporated by reference herein and made a part of this specification.

BACKGROUND OF THE INVENTION

1. Field of the Invention

The invention generally relates to a display device, and more particularly, to a display device including a liquid crystal lens.

2. Description of Related Art

Displays are requested to be equipped with an improved display quality in the aspects such as the image resolution and the color saturation along with the developing display technology. In addition to the consideration of the image quality of the displays, the development of the displays is progressed toward the displays capable of displaying three dimension (3D) or stereo images.

Recently, several types of the naked-eyes stereo (auto stereoscopic) display technologies are provided, such as the holographic type technology, the multi-plane technology, the parallax-image technology, and the like, wherein the parallax-image technology is served as a spatial-multiplexed stereo-display technology. In the spatial-multiplexed stereo-display technology, a column lens or a parallax barrier are usually applied to form different viewing zones in the space so that the right eye and the left eye of the user can respectively receive different image information for generating the stereo image.

Specifically, according to the visual characteristics of human, the stereo image can be generated in the human's brain when two images with the same content but different parallax are captured or received respectively by the right eye and the left eye. Therefore, the spatial-multiplexed stereo-display technology is achieved by controlling the transmission direction of the display light through the column lens or the parallax barrier to render the eyes of the user receive or capture different image information such that the stereo image can be obtained. Nevertheless, the display resolution is reduced when the spatial-multiplexed stereo-display technology is applied.

SUMMARY OF THE INVENTION

The invention directs to a display device having a liquid crystal lens capable of forming different lens units alternately to achieve the full resolution stereo image displaying.

The invention also directs to a method for driving a display device facilitating the full resolution stereo image displaying.

The invention provides a display device including a liquid crystal lens and a display panel. The liquid crystal lens is disposed above the display panel. The liquid crystal lens includes a first substrate, a second substrate, a liquid crystal layer, a plurality of driving electrodes, and an opposite electrode layer. The second substrate is opposite to the first substrate in a top-bottom manner. The liquid crystal layer is disposed between the first substrate and the second substrate. The driving electrodes are located between the first substrate and the liquid crystal layer and arranged in a pitch. The opposite electrode is arranged between the second substrate and the liquid crystal layer. The display panel has a plurality of display units arranged in the pitch. Under a stereo-display mode, two adjacent driving electrodes of the liquid crystal lens are driven respectively at a first time period and a second time period. The display panel is switched synchronically with the liquid crystal lens so that each display unit displays images with different parallax respectively at the first time period and the second time period.

The invention further provides s method for driving a display device. A display device including a liquid crystal lens and a display panel is provided. The liquid crystal lens includes a first substrate; a second substrate opposite to the first substrate in a top-bottom manner; a liquid crystal layer disposed between the first substrate and the second substrate; a plurality of driving electrodes located between the first substrate and the liquid crystal layer and arranged in a pitch; and an opposite electrode layer located between the second substrate and the liquid crystal layer. The display panel has a plurality of display units arranged in the pitch, and the liquid crystal lens is located above the display panel. In the method, one of two adjacent driving electrodes in the liquid crystal lens is driven at a first time period and the other of the two driving electrodes in the liquid crystal lens is driven at a second time period.

According to an embodiment of the invention, the liquid crystal lens further includes a plurality of auxiliary electrodes. The auxiliary electrodes are disposed between the driving electrodes and the liquid crystal layer and each auxiliary electrode is arranged corresponding to one of the driving electrode while an area of the driving electrode is greater than an area of the auxiliary electrode. Each driving electrode has an opening and the corresponding one auxiliary electrode is substantially aimed at the opening.

According to an embodiment of the invention, the switching frequencies of the liquid crystal lens and the display panel are substantially greater than or equivalent to 120 Hz under the stereo-display mode.

According to an embodiment of the invention, the liquid crystal layer of the liquid crystal lens defines a plurality of first lens units at the first time period and defines a plurality of second lens units at the second time period. Each of the first lens units and one of the second lens units are alternately arranged and a transversal distance between the each of the first lens units and the one of the second lens units is substantially equivalent to the pitch. The display units include a first display unit, a second display unit and a third display unit arranged sequentially and closely, such that the first display unit and the second display unit are corresponding to one of the first lens units while the third display unit is corresponding to another one of the first lens units at the first time period. Alternately, the display units includes a first display unit, a second display unit and a third display unit arranged sequentially and closely, such that the first display unit is corresponding to one of the second lens units and the second display unit and the third display unit are corresponding to another one of the second lens units at the second time period.

According to an embodiment of the invention, each display unit includes at least one display pixel.

According to an embodiment of the invention, at the first time period, $(2n-1)^{th}$ driving electrodes of the driving electrodes are driven while $(2n)^{th}$ driving electrodes of the driving electrodes are not driven and at the second time period, the $(2n-1)^{th}$ driving electrodes of the driving electrodes are not driven while the $(2n)^{th}$ driving electrodes of the driving electrodes are driven, wherein n is a positive integer.

In summary, according to the liquid crystal lens of the invention, two closely adjacent driving electrodes are driven at different time periods so that different lens units can be formed at different time periods. Accordingly, the display device can achieve the full resolution stereo image displaying when performing the stereo-display mode.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1A:
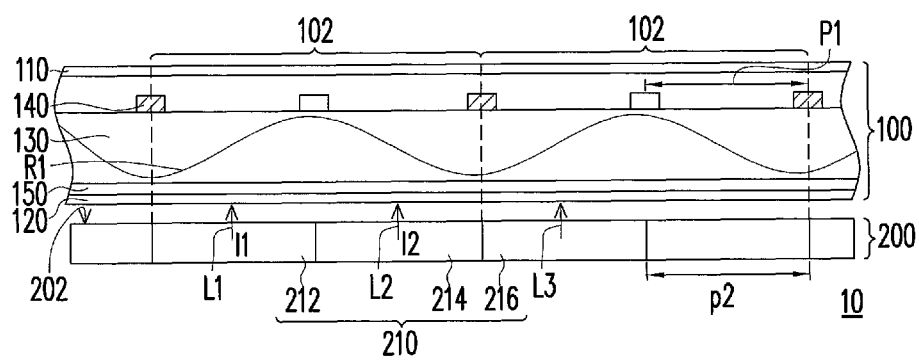
FIG. 1A and FIG. 1B are schematic views illustrating a display device according to an embodiment of the invention at a first time period and a second time period, respectively.
Figure 1B:
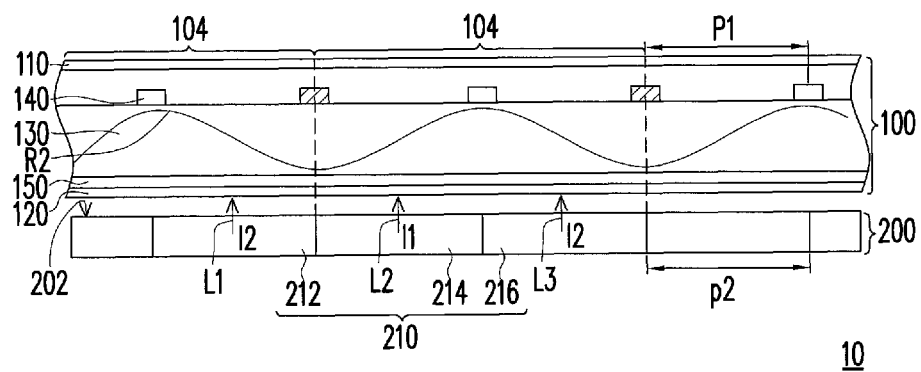

FIG. 1A and FIG. 1B are schematic views illustrating a display device according to an embodiment of the invention at a first time period and a second time period, respectively. Referring to FIGS. 1A and 1B simultaneously, a display device 10 includes a liquid crystal lens 100 and a display panel 200. A display surface 202 of the display panel 200 is faced to the liquid crystal lens 100, that is, the liquid crystal lens 100 is disposed above (in front of) the display panel 200. Accordingly, the display panel 200 equipped with the liquid crystal lens 100 can accomplish the stereo-display effect.

The liquid crystal lens 100 includes a first substrate 110, a second substrate 120, a liquid crystal layer 130, a plurality of driving electrodes 140, and an opposite electrode layer 150. The second substrate 120 is opposite to the first substrate 110 in a top-bottom manner. The liquid crystal layer 130 is disposed between the first substrate 110 and the second substrate 120. The driving electrodes 140 are located between the first substrate 110 and the liquid crystal layer 130 and the opposite electrode layer 150 is located between the second substrate 120 and the liquid crystal layer 130.

The display panel 200 has a plurality of display units 210. The display panel 200 can be any component capable of displaying images, such as a liquid crystal display panel, an organic electroluminescent display panel, a plasma display panel, an electrophoresis display panel, a field emission display panel, or other display panels. The display device 10 can selectively be equipped with a light source module for providing the required display light when a non-self illuminating material such as a liquid crystal material is adopted as the display medium of the display panel 200.

In the liquid crystal lens 100 of the present embodiment, the liquid crystal layer 130 as a whole is presented in an isotropic state when the driving electrodes 140 and the opposite electrode layer 150 are not driven. Herein, the image information provided by different display units 210 of the display panel 200 is transmitted in the original direction after the display light passing through the liquid crystal lens 100 so that a two dimensional (2D) image can be displayed. That is, the liquid crystal lens 100 can be undriven under the 2D display mode.

Alternately, in the liquid crystal lens 100 of the present embodiment, an electric field can be provided when the driving electrodes 140 and the opposite electrode layer 150 are driven such that the arrangement of the liquid crystals in the liquid crystal layer 130 can be changed to present a particular refractive index distribution. Now, the liquid crystal layer 130 having the particular refractive index distribution can provide the effect similar to an optical lens. Therefore, the image information provided by different display units 210 of the display panel 200 is transmitted toward different directions after the display light passing through the liquid crystal lens 100 so that a stereo image can be displayed. Consequently, the display device 10 can have at least two display modes, i.e. the stereo-display mode and the 2D display mode.

Under the stereo-display mode, the driving method of the liquid crystal lens 100 includes driving two adjacent driving electrodes 140 respectively at a first time period and a second time period, wherein the first time period and the second time period can be two closely adjacent time periods and be located within a same frame period for displaying a same image. In detail, the states of the liquid crystal lens 100 at the first time period and the second time period are respectively shown in FIG. 1A and FIG. 1B.

At the first time period as shown in FIG. 1A, only the $(2n-1)^{th}$ driving electrodes 140 of the driving electrodes 140 are driven, wherein n is a positive integer. It is noted that the driving electrodes 140 marked by the oblique line shadow in FIG. 1A are the ones being driven. At this time, the refractive index distribution of the liquid crystal layer 130 can be shown as the curve R1, so that a plurality of first lens units 102 can be defined by the liquid crystal layer 130, wherein the refractive index of the liquid crystal layer 130 in each first lens unit 102 is gradually varied outward from a center region.

In the present embodiment, the driving electrodes 140 are arranged in a pitch P1 and the display units 210 are arranged in a pitch P2, wherein the pitch P1 is substantially equivalent to the pitch P2. Accordingly, a width of each first lens unit 102 can be twice of the pitch P1 between the driving electrodes 140 when only the $(2n-1)^{th}$ driving electrodes 140 of the driving electrodes 140 are driven at the first time period. It can be understood that each first lens unit 102 is substantially corresponding to two display units 210. As to three closely adjacent display units 212, 214, and 216, the display light L1 of the display unit 212 and the display light L2 of the display unit 214 can be subjected to the effect of the same first lens unit 102 and the display light L3 of the display unit 216 can be subjected to the effect of another first lens unit 102.

Based on the drawing of FIG. 1A, the display unit 212 and the display unit 214 are respectively corresponding to the left portion and the right portion of the same first lens unit 102. It is assumed that the left portion and the right portion of the same first lens unit 102 can refract the light from display panel 200 toward the left front side and the right front side, respectively by the effect of the refractive index distribution of the first lens unit 102. The display light L1 and the display light L3 can thus be transmitted toward the left front side after subjected to the effect of the first lens units 102 and emitted out from the display device 10. The display light L2 can be transmitted toward the right front side after subjected to the effect of the first lens unit 102 and emitted out from the display device 10. When the display unit 212 and the display unit 214 provide the image information with different parallax at the first time period, the user can see a stereo image.

At the first time period, the display units 212 and 214 corresponding to the same first lens unit 102 respectively provide the image information I1 and the image information I2. At this time, the display light L1 can be emitted toward the left front side by subjected to the effect of the liquid crystal lens 100 so as to be received by the right eye of the user and the display light L2 can be emitted toward the right front side by subjected to the effect of the liquid crystal lens 100 so as to be received by the left eye of the user. The user can feel the stereo image owing that the image information I1 and the image information I2 are respectively a right-eye image information and a left-eye image information.

In the present embodiment, the display light from adjacent display units 210 can be emitted toward different directions by the effect provided by each first lens unit 102. Accordingly, the display device 10 can perform the stereo-display mode in a spatial-multiplexed way at the first time period. As a result, the image information captured or received by any eye of the user is provided by a half of the total quantity of the display units 210. Namely, the image resolution provided by the display device 10 at the first time period is a half of the resolution of the display panel 200.

Accordingly, at the second time period as shown in FIG. 1B, only the $(2n)^{th}$ driving electrodes 140 of the driving electrodes 140 in the liquid crystal lens 100 are driven. It is noted that the driving electrodes 140 marked by the oblique line shadow in FIG. 1B are the driven ones. At this time, the refractive index distribution of the liquid crystal layer 130 can be presented as the curve R2 and define a plurality of second lens units 104. According to FIG. 1A and FIG. 1B, the first lens units 102 and the second lens units 104 are arranged alternately in space and a transversal distance between one first lens unit 102 and one second lens unit 104 adjacent to the one first lens unit 102 is substantially equivalent to the pitch P1 and the pitch P2, i.e. a half of the width of the lens unit.

As to three closely adjacent display units 212, 214, and 216, the display light L2 of the display unit 214 and the display light L3 of the display unit 216 can be subjected to the effect of the same second lens unit 104 and the display light L1 of the display unit 212 can be subjected to the effect of another second lens unit 104. In other words, the display unit 212 can correspond to the right portion of the lens unit (the second lens unit 104) at the second time period as shown in FIG. 1B while the display unit 212 corresponds to the left portion of the lens unit (the first lens unit 102) at the first time period as shown in FIG. 1A. Accordingly, at the second time period, the display light L1 of the display unit 212 is transmitted toward the right front side and emitted out from the display device 10. According to similar regulation, at the second time period, the display light L2 emitted out from the display device 10 is transmitted toward the left front side and the display light L3 emitted out from the display device 10 is transmitted toward the right front side.

At the second time period, the display light L1 can be emitted toward the right front side by subjected to the effect of the liquid crystal lens 100 so as to be received by the left eye of the user and the display light L2 can be emitted toward the left front side by subjected to the effect of the liquid crystal lens 100 so as to be received by the right eye of the user. The display units 212 and 214 can provide the (left-eye) image information I2 and the (right-eye) image information I1 at the second time period. Consequently, for one single display unit 212, the provided display light L1 can be received by the right eye of the user at the first time period and received by the left eye of the user at the second time period. The image resolution seen by the user can thus be equivalent to the total quantity of the display units 210. In other words, the display device 10 can adopt the driving method of switching the liquid crystal lens 100 by a time-multiplexed way under the stereo-display mode and the image information provided by the display units 210 is synchronically refreshed to accomplish the full resolution display effect.

It is noted that the full resolution depicted in the present embodiment lies in that the displayed image seen by the user has the resolution equivalent to the total amount of the display units 210, wherein each of the display units 210 can includes one or more display pixel(s) according to the design requirement when the display panel 200 has a plurality of display pixels. Therefore, the full resolution represented in the embodiment does not limit to be equivalent to the total quantity of the display pixels.

For instance, when the display unit 210 includes only one display pixel, each of the first lens units 102 and each of the second lens units 104 can correspond to two display units 210. Herein, two viewing zones (such as the right-eye viewing zone and the left-eye viewing zone) can be formed when the display device 10 displays the stereo images and the displayed image has the resolution equivalent to the quantity of the display pixels. In other designs, when the display unit 210 includes N display pixels, each of the first lens units 102 and each of the second lens units 104 can correspond to 2N display units 210 and N viewing zones can be formed when the display device 10 displays the stereo images. Herein, the display device 10 can provide stereo images at different viewing angles, but the resolution of the displayed stereo image is the quantity of the display units 210 (i.e. 1/N of the total quantity of the display pixels).

In addition, the display device 10 drives the liquid crystal lens 100 in the time-multiplexed way and synchronically switches the image information provided by the display panel 200 to achieve the full resolution stereo-display effect. Accordingly, under the stereo-display mode, the switching frequencies of the liquid crystal lens 100 and the display panel 200 can both greater than or equivalent to 120 Hz, that is, the switching frequency of the first time period and the second time period can be at least equivalent to 120 Hz. It is for sure that the invention should not be construed as limited to the embodiment described above.

Figure 2:
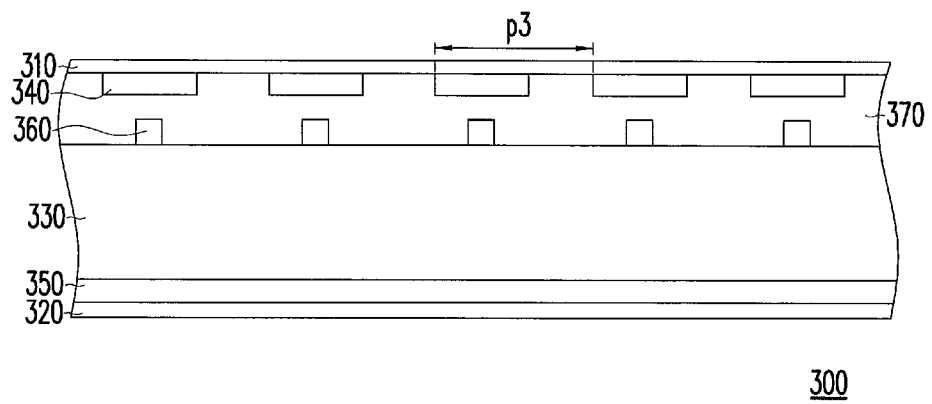
FIG. 2 is a schematic view illustrating a liquid crystal lens according to an embodiment of the invention.

FIG. 2 is a schematic view illustrating a liquid crystal lens according to an embodiment of the invention. Referring to FIG. 2, a liquid crystal lens 300 can be applied in the display device 10 depicted in FIG. 1A and FIG. 1B to substitute the liquid crystal lens 100. The liquid crystal lens 300 includes a first substrate 310, a second substrate 320, a liquid crystal layer 330, a plurality of driving electrodes 340, an opposite electrode layer 350, and a plurality of auxiliary electrodes 360. The second substrate 320 is opposite to the first substrate 310 in a top-bottom manner The liquid crystal layer 330 is disposed between the first substrate 310 and the second substrate 320. The driving electrodes 340 are located between the first substrate 310 and the liquid crystal layer 330 and the opposite electrode layer 350 is located between the second substrate 320 and the liquid crystal layer 330. The auxiliary electrodes 360 are disposed between the driving electrodes 340 and the liquid crystal layer 330 and the driving electrodes 340 are substantially separated from the auxiliary electrodes 360 by an insulation layer 370.

In the present embodiment, a width of one driving electrode 340 is greater than a width of the corresponding auxiliary electrode 360. In a direction perpendicular to the first substrate 310 (i.e. the normal direction of the first substrate 310), each auxiliary electrode 360 is correspondingly located within the profile of one driving electrode 340. Namely, an area of one driving electrode 340 is greater than an area of the corresponding auxiliary electrode 360. During performing the stereo-display mode, the driving electrodes 340 have a first voltage, the auxiliary electrodes 360 have a second voltage, and the opposite electrode layer 350 have a common voltage, which provides the electric field to drive the liquid crystal layer 330 for generating the optical effect similar to an optical lens. In other words, during performing the stereo-display mode, the driving electrodes 340 and the auxiliary electrodes 360 can be applied by different voltages for obtaining the required electric field capable of controlling the refractive index distribution of the liquid crystal layer 330.

Figure 3:
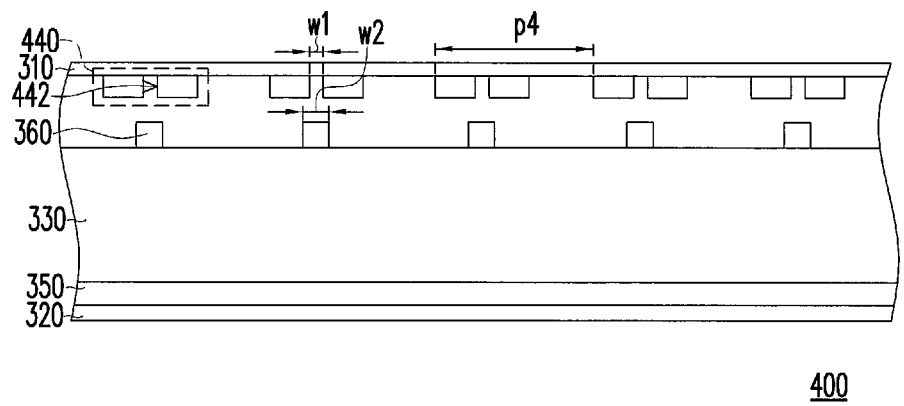
FIG. 3 is a schematic view illustrating a liquid crystal lens according to another embodiment of the invention.

FIG. 3 is a schematic view illustrating a liquid crystal lens according to another embodiment of the invention. Referring to FIG. 3, a liquid crystal lens 400, similar to the liquid crystal lens 300, can be applied in the display device 10 depicted in FIG. 1A and FIG. 1B. The same components of the liquid crystal lens 400 and the liquid crystal lens 300 are represented by the same reference number. In specific, the difference between the liquid crystal lens 400 and the liquid crystal lens 400 mainly lies in that each driving electrode 440 of the liquid crystal lens 400 has an opening 442 and the auxiliary electrode 360 corresponding thereto is substantially aimed at the opening 442.

A ratio of the first width w1 of the opening 442 configured in the driving electrode 440 to the second width w2 of the auxiliary electrode 360 can be from 1% to 500%, or from 100% to 200%. However, the invention is not limited thereto. In other words, the first width w1 can be equivalent to, greater than, or smaller than the second width w2. The configuration of the opening 442 according to the present embodiment is conducive to reduce the coupled capacitance between the driving electrodes 440 and the auxiliary electrode 360 so that the loading of the driving electrode 440 can be diminished. Accordingly, the driving voltage required by the liquid crystal lens 400 is reduced to decrease the required driving energy.

It is noted that the liquid crystal lens 300 and the liquid crystal lens 400 can be applied in the display device 10 depicted in FIG. 1A and FIG. 1B. Therefore, the pitch P3 between the driving electrodes 340 of the liquid crystal lens 300 and the pitch P4 between the driving electrodes 440 of the liquid crystal lens 400 can be modified according to the design of the display panel 200, such that the pitch P3 and the pitch P4 can be equivalent to the pitch P2 between the display units 210 of the display panel 200. When the liquid crystal lens 300 and the liquid crystal lens 400 are used for displaying the stereo images, any adjacent two of the driving electrodes 340 are driven at different time periods and any adjacent two driving electrodes 440 are driven at different time periods. Therefore, each of the lens units formed by the liquid crystal lens 300 or the liquid crystal lens 400 substantially have a width equivalent to the width of two display units 210 and the lens units formed at different time periods are shifted a distance from each other in space, wherein the distance is equivalent to the width of one display unit (i.e. the pitch P2 or a half of the width of one lens unit). In the driving method mentioned above, the full resolution stereo-display effect can be accomplished. Certainly, the above-mentioned liquid crystal lenses are merely exemplary and should not be construed as limitations to this invention. The invention can be achieved by rendering the pitch of the driving electrodes in the liquid crystal lens equivalent to the pitch of the display units of the display panel and driving the odd driving electrodes and the even driving electrodes at different time periods.

Figure 4A:
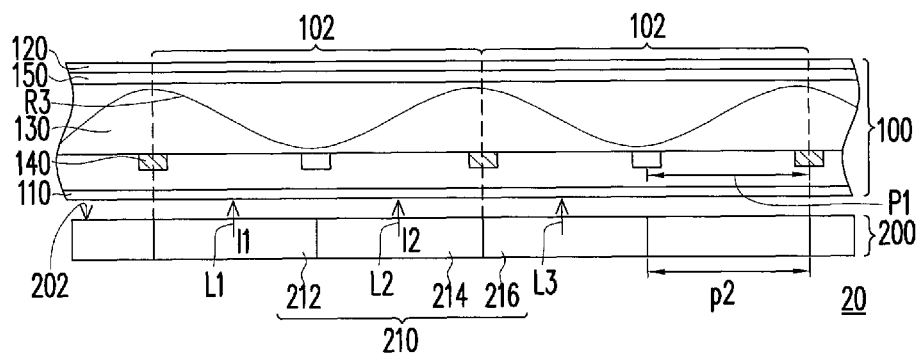
FIG. 4A and FIG. 4B are schematic views illustrating a display device according to an embodiment of the invention at a first time period and a second time period, respectively.
Figure 4B:
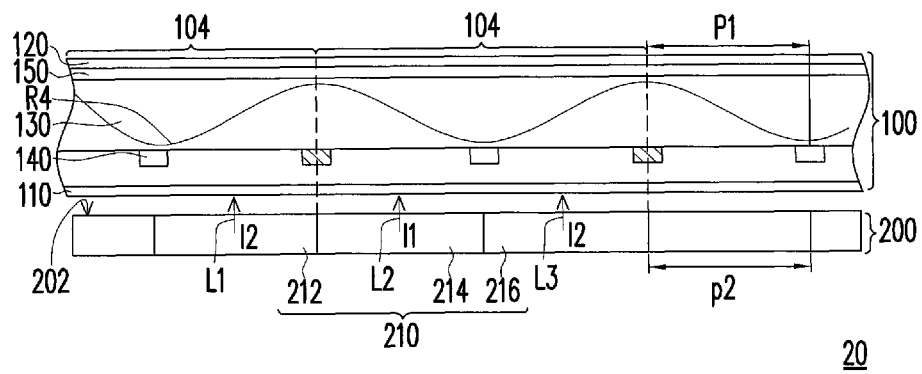

FIG. 4A and FIG. 4B are schematic views illustrating a display device according to an embodiment of the invention at a first time period and a second time period, respectively. Referring to FIG. 4A, the display device 20, similar to the above mentioned display device 10, includes a liquid crystal lens 100 and a display panel 200. A display surface 202 of the display panel 200 is faced to the liquid crystal lens 100, that is, the liquid crystal lens 100 is disposed above (in front of) the display panel 200. Accordingly, the display panel 200 equipped with the liquid crystal lens 100 can accomplish the stereo-display effect by the effect of the liquid crystal lens 100. It is noted that the difference between the embodiment and those depicted in FIG. 1A mainly lies in the disposition of the quid crystal lens 100.

Specifically, the liquid crystal lens 100 includes a first substrate 110, a second substrate 120, a liquid crystal layer 130, a plurality of driving electrodes 140, and an opposite electrode layer 150. The second substrate 120 is opposite to the first substrate 110 in a top-bottom manner The liquid crystal layer 130 is disposed between the first substrate 110 and the second substrate 120. The driving electrodes 140 are located between the first substrate 110 and the liquid crystal layer 130 and the opposite electrode layer 150 is located between the second substrate 120 and the liquid crystal layer 130. Particularly, the first substrate 110 in the present embodiment is relatively adjacent to the display panel 200 than the second substrate 120, such that the driving electrodes 140 according to the present embodiment are located between the liquid crystal layer 130 and the display panel 200.

At the first time period as shown in FIG. 4A, only the $(2n-1)^{th}$ driving electrodes 140 of the driving electrodes 140 are driven, wherein n is a positive integer. It is noted that the driving electrodes 140 marked by the oblique line shadow in FIG. 4A are the ones being driven. At this time, the refractive index distribution of the liquid crystal layer 130 can be shown as the curve R3, so that a plurality of first lens units 102 can be defined by the liquid crystal layer 130.

The display light L1 and the display light L3 can thus be transmitted toward the right front side after subjected to the effect of the first lens units 102 and emitted out from the display device 20. The display light L2 can be transmitted toward the left front side after subjected to the effect of the first lens unit 102 and emitted out from the display device 20. When the display unit 212 and the display unit 214 provide the image information with different parallax at the first time period, the user can see a stereo image.

At the subsequent second time period as shown in FIG. 4B, only the $(2n)^{th}$ driving electrodes 140 of the driving electrodes 140 in the liquid crystal lens 100 are driven. It is noted that the driving electrodes 140 marked by the oblique line shadow in FIG. 1B are the driven ones. At this time, the refractive index distribution of the liquid crystal layer 130 can be presented as the curve R4 and define a plurality of second lens units 104. According to FIG. 4A and FIG. 4B, the first lens units 102 and the second lens units 104 are arranged alternately in space and a transversal distance between one first lens unit 102 and one second lens unit 104 adjacent to the one first lens unit 102 is substantially equivalent to the pitch P1 and the pitch P2, i.e. a half of the width of the lens unit.

As to three closely adjacent display units 212, 214, and 216, the display light L2 of the display unit 214 and the display light L3 of the display unit 216 can be subjected to the effect of the same second lens unit 104 and the display light L1 of the display unit 212 can be subjected to the effect of another second lens unit 104. In other words, the display unit 212 can correspond to the left portion of the lens unit (the second lens unit 104) at the second time period as shown in FIG. 4B while the display unit 212 corresponds to the right portion of the lens unit (the first lens unit 102) at the first time period as shown in FIG. 4A. Accordingly, at the second time period, the display light L1 of the display unit 212 is transmitted toward the left front side and emitted out from the display device 20. According to similar regulation, at the second time period, the display light L2 emitted out from the display device 20 is transmitted toward the right front side and the display light L3 emitted out from the display device 20 is transmitted toward the left front side. When the display units 212 and 214 provide the (left eye) image information I2 and the (right eye) image information I2 respectively, the stereo-display effect is accomplished.

For one single display unit 212, the provided display light L1 can be received by the left eye of the user at the first time period and received by the right eye of the user at the second time period. The image resolution seen by the user can thus be equivalent to the total quantity of the display units 210. In other words, the display device 20 can adopt the driving method of switching the liquid crystal lens 100 by a time-multiplexed way under the stereo-display mode and the image information provided by the display units 210 is synchronically refreshed to accomplish the full resolution display effect. Furthermore, the embodiment is not limited thereto, in another embodiment, the driving electrodes 140 can be modified to have the arrangement of the electrodes as depicted in FIG. 2 and FIG. 3.

In view of the above, according to the liquid crystal lens of the invention, two closely adjacent driving electrodes are driven at different time periods so that the refractive index distribution of the liquid crystal layer can be changed. The pitch of the driving electrodes is equivalent to the pitch of the display units of the display panel. Herein, the display light provided by the same one display unit can be emitted toward different directions at different time periods. Accordingly, the display light of each display unit can be emitted toward different directions at different time periods by synchronizing the driving of the driving electrodes in the liquid crystal lens and the switching of the image information provided by each display units in the display panel, which facilitates the full resolution stereo-display effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A display device comprising:
    a liquid crystal lens comprising:
        a first substrate;
        a second substrate opposite to the first substrate in a top-bottom manner;
        a liquid crystal layer disposed between the first substrate and the second substrate, wherein the liquid crystal layer of the liquid crystal lens defines a plurality of first lens units at a first time period and defines a plurality of second lens units at a second time period, each first lens unit and one second lens unit are arranged alternately in space and a transversal distance between the each first lens unit and the one second lens unit is substantially equivalent to a pitch;
        a plurality of driving electrodes located between the first substrate and the liquid crystal layer and arranged in the pitch;
        an opposite electrode layer located between the second substrate and the liquid crystal layer; and
    a display panel having a plurality of display units arranged in the pitch, the liquid crystal lens being located above the display panel, wherein under a stereo-display mode, two adjacent driving electrodes in the liquid crystal lens are driven respectively at the first time period and the second time period and the display panel is switched synchronically with the liquid crystal lens so that each display unit displays images with different parallax respectively at the first time period and the second time period, wherein the display units comprises a first display unit, a second display unit and a third display unit arranged sequentially and closely, such that at the first time period, the first display unit and the second display unit are corresponding to one of the first lens units and the third display unit is corresponding to another of the first lens units adjacent to the one of the first lens units to which the first display unit and the second display unit are corresponding.

2. The display device as claimed in claim 1, wherein the liquid crystal lens further comprises a plurality of auxiliary electrodes disposed between the driving electrodes and the liquid crystal layer, and each auxiliary electrode is arranged corresponding to one of the driving electrodes.

3. The display device as claimed in claim 2, wherein each driving electrode has an opening and the corresponding one of the auxiliary electrodes is substantially aimed at the opening.

4. The display device as claimed in claim 2, wherein an area of each driving electrode is greater than an area of the corresponding auxiliary electrode.

5. The display device as claimed in claim 1, wherein the switching frequencies of the liquid crystal lens and the display panel are substantially greater than or equivalent to 120 Hz under the stereo-display mode.

6. The display device as claimed in claim 1, wherein at the second time period, the first display unit is corresponding to one of the second lens units and the second display unit and the third display unit are corresponding to another of the second lens units adjacent to the one of the second lens units to which the first display unit is corresponding.

7. The display device as claimed in claim 1, wherein each display unit comprises at least one display pixel.

8. The display device as claimed in claim 1, wherein at the first time period, $(2n-1)^{th}$ driving electrodes of the driving electrodes are driven while $(2n)^{th}$ driving electrodes of the driving electrodes are not driven and at the second time period, the $(2n-1)^{th}$ driving electrodes of the driving electrodes are not driven while the $(2n)^{th}$ driving electrodes of the driving electrodes are driven, wherein n is a positive integer.

9. A method for driving a display device, the method comprising:
    providing a display device comprising:
        a liquid crystal lens comprising:
            a first substrate;
            a second substrate opposite to the first substrate in a top-bottom manner;
            a liquid crystal layer disposed between the first substrate and the second substrate, wherein the liquid crystal layer of the liquid crystal lens defines a plurality of first lens units at a first time period and defines a plurality of second lens units at a second time period, each first lens unit and one second lens unit are arranged alternately in space and a transversal distance between the each first lens unit and the one second lens unit is substantially equivalent to a pitch;

a plurality of driving electrodes located between the first substrate and the liquid crystal layer and arranged in the pitch;

an opposite electrode layer located between the second substrate and the liquid crystal layer; and a display panel having a plurality of display units arranged in the pitch, the liquid crystal lens being located above the display panel, wherein the display units comprises a first display unit, a second display unit and a third display unit arranged sequentially and closely, such that at the first time period, the first display unit and the second display unit are corresponding to one of the first lens units and the third display unit is corresponding to another of the first lens units adjacent to the one of the first lens units to which the first display unit and the second display unit are corresponding;

driving one of two adjacent driving electrodes in the liquid crystal lens at the first time period; and driving the other of the two driving electrodes in the liquid crystal lens at the second time period.

10. The method as claimed in claim 9, wherein the switching frequencies of the liquid crystal lens and the display panel are substantially greater than or equivalent to 120 Hz under the stereo-display mode.

11. The method as claimed in claim 9, wherein at the second time period, the first display unit is corresponding to one of the second lens units and the second display unit and the third display unit are corresponding to another of the second lens units adjacent to the one of the second lens units to which the first display unit is corresponding.

12. The method as claimed in claim 9, wherein at the first time period, the $(2n-1)^{th}$ driving electrodes of the driving electrodes are driven while $(2n)^{th}$ driving electrodes of the driving electrodes are not driven and at the second time period, the $(2n-1)^{th}$ driving electrodes of the driving electrodes are not driven while the $(2n)^{th}$ driving electrodes of the driving electrodes are driven, wherein n is a positive integer.

* * * * *